United States Patent

[11] 3,554,331

| [72] | Inventor | Hans Pollinger |
| | | Munich, Germany |
| [21] | Appl. No. | 776,050 |
| [22] | Filed | Nov. 15, 1968 |
| [45] | Patented | Jan. 12, 1971 |
| [73] | Assignee | Knorr-Bremse G.m.b.H. |
| | | Munich, Germany |
| | | a corporation of Germany |
| [32] | Priority | Dec. 5, 1967 |
| [33] | | Germany |
| [31] | | 1,605,284 |

[54] BRAKING UNIT FOR RAILWAY VEHICLES
1 Claim, 3 Drawing Figs.
[52] U.S. Cl. ............................... 188/74,
188/153, 188/170
[51] Int. Cl. ............................... F16d 65/26,
B61h 13/28
[50] Field of Search ............................... 188/74,
52, 153, 198, 203S, 170, 107

[56] References Cited
UNITED STATES PATENTS

| 8,812 | 3/1852 | Walber | 188/153X |
| 175,886 | 4/1876 | Westinghouse | 188/153 |
| 2,531,055 | 11/1950 | Kirk | 188/170X |
| 2,913,071 | 11/1959 | Mueller | 188/153 |
| 3,430,739 | 3/1969 | Persson et al. | 188/202(S) |

*Primary Examiner*—Duane A. Reger
*Attorney*—Edmund M. Jaskiewicz

ABSTRACT: A railway vehicle wherein brake shoes are applied against the periphery of a wheel to achieve the braking effect is provided with a braking unit in which axial movement of an actuating rod is translated at right angles to axial movement of one or more brake shoe rods. The translating of motion is achieved by a wedge member carried by the actuating rod and acting upon a parallel inclined surface on the brake shoe rod through roller means interposed between the parallel surfaces. The brake unit comprises a housing and an actuating cylinder attached thereto with the entire unit being mounted on the frame of the railway vehicle.

3,554,331

INVENTOR
HANS POLLINGER

Edmund M. Jaskiewicz
ATTORNEY

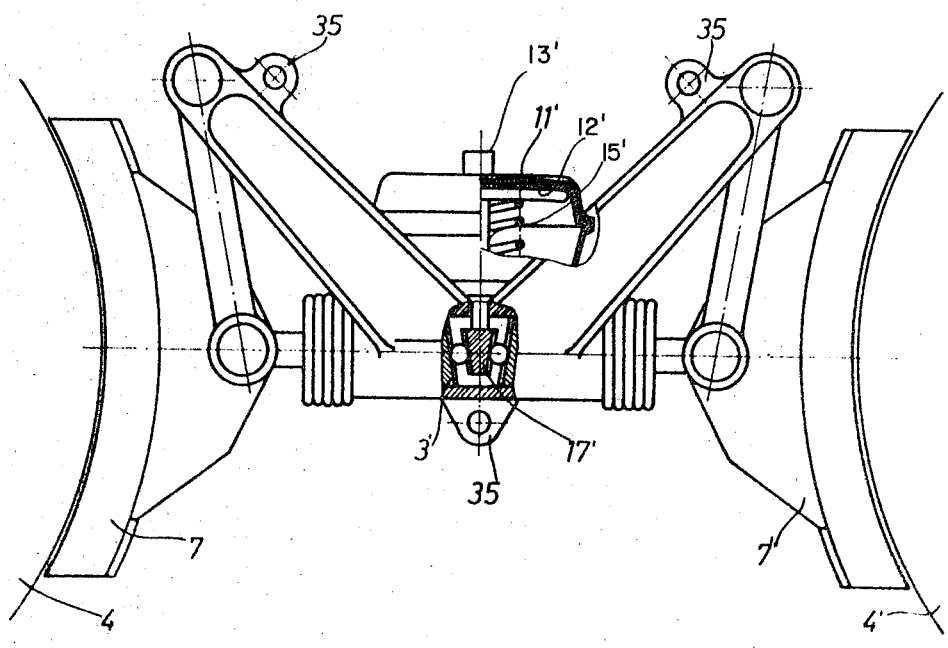

BRAKING UNIT FOR RAILWAY VEHICLES

The present invention relates to railway vehicle-braking systems, more particularly, to a braking unit for actuating the brake shoes engageable with the wheels of a railway vehicle.

One form of a braking unit for actuating the brake shoes with respect to the wheels of a railway vehicle comprises an actuating cylinder containing a piston movable therein under the action of compressed air. The force exerted by the piston is transmitted through a suitable mechanism to a brake shoe rod which moves in a direction substantially radially to the peripheral surface of a railway wheel. Braking is achieved by urging the brake shoe into contact with the periphery of the wheel through the force exerted by the actuating piston. The housing of the actuating cylinder and the housing for the translating mechanism are rigidly connected to each other and mounted from the frame of the vehicle.

In such braking units the translating mechanism may consist of a single or double arm translation lever which is pivotally mounted on the housing with one side of the lever being connected to the actuating piston and the other side being connected to a rod upon whose end there is mounted a brake shoe. Such linkages have been provided with adjustable structures which automatically vary in length to compensate for brake shoe wear.

In motor vehicles having cylinder and disc brakes-translating mechanisms have been used comprising wedges with the wedge being driven by the actuating member. The braking member may be provided with an inclined surface which is parallel to an inclined surface of the wedge with roller means being positioned between the inclined surfaces to transmit the force of the actuating member to the braking member. The wedge actuated translation mechanisms are preferable to the lever form of translation mechanisms since the wedges occupy considerably less space and are capable of high translation ratios by a suitable choice of wedge angles.

It is therefore the principal object of the present invention to provide a novel and improved braking unit for railway vehicles.

It is another object of the present invention to provide a railway vehicle-braking unit having a simple and effective mechanism for translating force transmitted by an actuating rod at right angles to a brake shoe rod.

It is a further object of the present invention to provide a railway vehicle-braking unit having a translating mechanism which occupies a minimum of space but is capable of high translation ratios.

In one aspect of the present invention there may be provided a braking unit wherein the direction of the axial movement of an actuating rod intersects the direction of axial movement of a brake shoe rod at a right angle. The end of the brake shoe rod remote from the brake shoe is provided with an inclined surface which is parallel to an inclined surface of a wedge carried by the actuating rod. Roller means are positioned between the parallel surfaces so that axial movement of the actuating rod will be translated into axial movement of the brake shoe rod to urge the brake shoe against the periphery of the railway vehicle wheel. The actuating rod may be connected to a piston in a fluid pressure-actuating cylinder. The brake shoe rod and the translating mechanism for the brake shoe rod and actuating rod are enclosed in a housing which is rigidly connected to the actuating cylinder. The rigidly connected housings may be mounted on the railway vehicle frame. Thus, axial movement of the actuating rod may be the result of a fluid pressure cylinder, manually operated brake linkage or spring means. In all cases the axial movement of the actuating rod will be transmitted at right angles to cause axial movement of the brake shoe rod.

Other objects and advantages of the present invention will be apparent upon reference to the accompanying description when taken in conjunction with the following drawings wherein;

FIG. 3 is a view similar to that of FIGS. 1 and 2 but showing a modified form of the braking unit wherein two brake shoes can be operated in opposite directions.

Proceeding next to the drawings wherein like reference symbols indicate the same parts throughout the various views a specific embodiment and modifications of the present invention will be described in detail.

Figure 1:
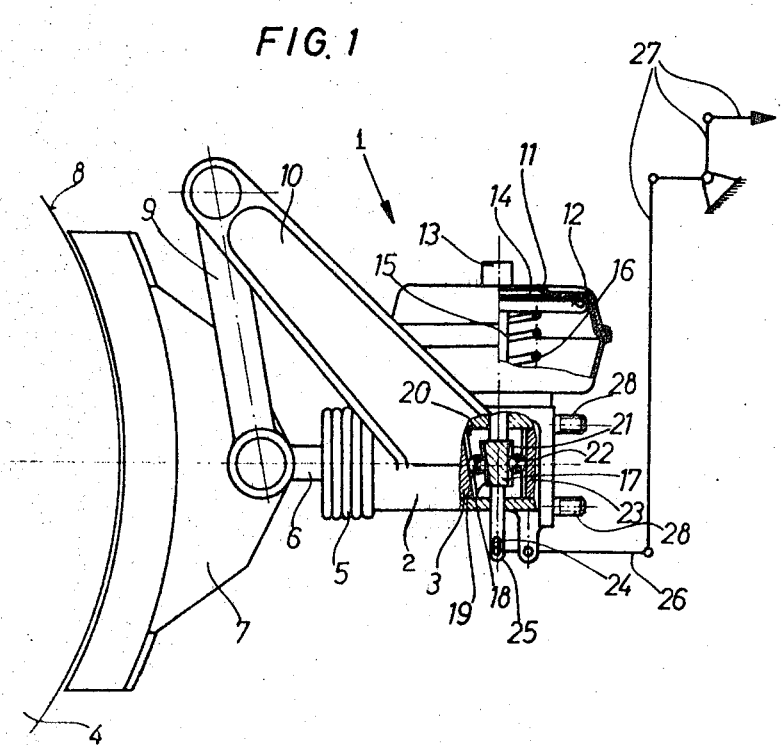
FIG. 1 is a side elevational view of a braking unit according to the present invention with portions thereof being cut away and with a manually operated brake linkage connected to the actuating rod.

As may be seen in FIG. 1, a braking unit according to the present invention is indicated generally at 1 and comprises a 2 in which there is slidably mounted a brake shoe rod 3 for movement in substantially a horizontal plane. The brake shoe rod 3 moves axially in a radial direction with respect to a railway vehicle wheel 4 and is sealed to the outer end of the housing by means of a flexible bellows 5. The end of the brake shoe rod protruding from bellows 5 is indicated at 6 and is pivotally connected to a brake shoe 7 which engages the periphery 8 of the railway wheel to form a friction brake. The brake shoe 7 is movably suspended by a link 9 from a carrier arm 10 extending upwardly from the housing 1. The link 9 is substantially perpendicular to the longitudinal axis of the brake shoe rod 3.

The housing 1 is rigidly connected to an actuating cylinder housing for a diaphragm brake cylinder 11. The brake cylinder is provided with a diaphragm piston 12 one side of which is subjected to fluid pressure in the form of compressed air supplied through a conduit connection 13 communicating to a cylinder chamber 14 on that side of the diaphragm. On the other side of the diaphragm there is connected a piston rod 15 whose other end is mounted slidably within housing 1 in a direction perpendicular to the longitudinal axis of the brake shoe rod 3. A compression spring 16 acts upon the piston rod side of the diaphragm piston 12.

Within the housing 1, the piston rod 15 carries a wedge 17 having an inclined surface 18 facing toward the end of the brake shoe rod 3. The inclined surface 18 slopes outwardly in a direction toward the diaphragm piston 12. The inner end of the brake shoe rod 3 is provided with an inclined surface or face 20 which is opposite from and parallel to inclined wedge surface 18. A roller 19 is interposed between the two parallel inclined surfaces.

The wedge 17 is provided with a rear face 21 which is supported through a roller 22 against a rear inside wall 23 of the housing 1 with said rear wall being perpendicular to the longitudinal axis of brake shoe rod 3.

The lower or free end of piston rod 15 projects outwardly from housing 1 as may be seen in FIG. 1 and is provided with an elongated opening 24. A pin or bolt 25 on one end of a lever 26 is slidably received within the elongated opening. The lever 26 is pivotally mounted on the housing 1 and has its other end pivotally connected to manually operated brake linkages 27 of a known construction and schematically illustrated in FIG. 1.

The brake unit comprising housing 2 and the actuating cylinder housing is mounted to the frame of a railway vehicle (not shown in the drawings) by means of a pair of threaded studs 28 projecting outwardly from the housing 2. Within the housing 2 there is provided a return spring, not shown in the drawings, which urges the brake shoe rod 3 rearwardly or to the right as viewed in FIG. 1 in opposition to the force exerted upon the brake shoe rod by the wedge 17.

In the resting or unactuated position the compression spring 16 will retain the diaphragm piston 12 in its uppermost position and the brake shoe rod 3 will be urged against the wedge 17 through roller 19 under the action of its return spring as described above. The brake shoe 7 is thus in a disengaged position with respect to the brake wheel periphery 8 by this slight disengaging force. To actuate or engage the brake, compressed air is introduced through the connection 13 into cylinder chamber 14 to urge the diaphragm piston 12 and the piston rod 15 downwardly against the force of the compression spring 16. The wedge 17 will also be carried downwardly and the inclined wedge surface 18 will push the roller 19 against inclined face 20 of the brake shoe rod in the direction of the railway vehicle wheel 4 to cause the brake shoe 7 to press against the periphery of the wheel. The force which initially is applied to the diaphragm piston 12 is translated according to the inclination angle of the wedge 17 and then transmitted to the brake shoe rod 3 to cause the brake shoe 7 to exert a correspondingly high force against the wheel periphery 8. The reaction of the force being applied by the wedge at the same time is delivered to the housing 2 and then to the vehicle frame to which the braking unit is attached.

During the downward vertical movement of the piston rod 15 the brake linkage mechanism 27 and lever 26 will be unaffected since the pin 25 will slide upwardly in the elongated opening in the piston rod. The braking moment which is exerted as a tangential force by the brake shoe 7 acting upon the periphery 8 of the railway wheel is transmitted by the link 9 and the carrier arm 10 to the housing 2 and then to the vehicle frame.

To disengage the brake, the chamber 14 within the actuating cylinder is evacuated and the compression spring 16 in the actuating cylinder housing and the return spring in housing 2 will return the components of the braking unit to their initial, or disengaged, positions as illustrated in FIG. 1.

For manual operation of the brake unit of the present invention, the lever 26 is pivoted counterclockwise as viewed in FIG. 1 in response to the actuation of the linkage mechanism 27. The pin 25 will act against the lower end of the elongated opening 24 and will function as an impact coupling to move piston rod 15 vertically downwardly against the force of spring 26 in response to the pivoting movement of lever 26. The braking force will be transmitted to the brake shoe 7 in the same manner as described above.

When the brake shoe is in the disengaged position as illustrated in FIG. 1 there will be a space between the wheel periphery 8 and the brake shoe. To keep this space constant after repeated applications of the brake the brake shoe rod 3 may be provided with an adjustable coupling which is known in the art to automatically adjust the length of the brake shoe rod to compensate for wear on the brake shoe 7.

Figure 2:
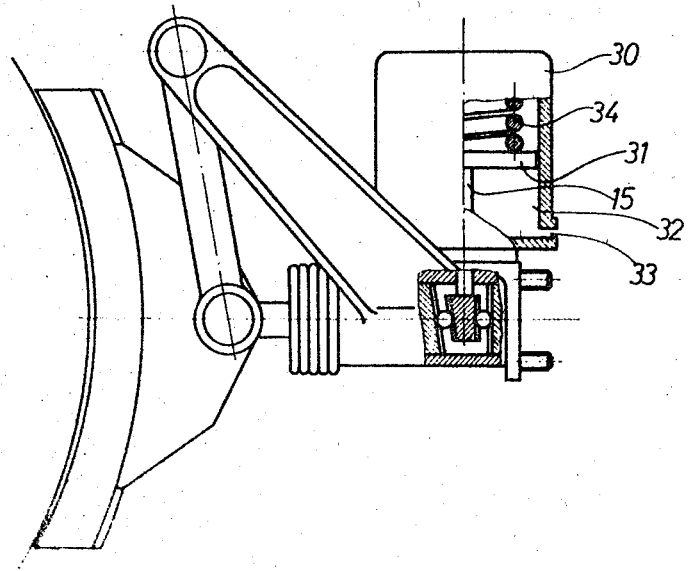
FIG. 2 is a view similar to that of FIG. 1 but the brake unit is provided with a spring biased-actuating piston.

In the modification as shown in FIG. 2 the actuating cylinder comprises a spring storage cylinder 30 having a piston 31 movable therein and connected to the piston rod 15. The piston rod side of piston 31 forms a wall of a cylinder chamber 32 which is connected at 33 to a source of compressed air. A storage spring 34 acts upon the other side of the piston 31. With the exception of the omission of the manually operated mechanism, the braking unit of FIG. 2 is similar to the one disclosed in FIG. 1.

As long as the pressure of the air in cylinder chamber 32 is above a predetermined level the piston 31 will be maintained in its uppermost position against the pressure of storage spring 34 and the brake will be disengaged. Should the pressure in cylinder chamber 32 decrease below the predetermined level the storage spring 34 will then move the piston 31 and the piston rod 15 vertically downwardly to initiate braking action in the manner described above with reference to the unit illustrated in FIG. 1.

Proceeding next to FIG. 3 there is shown a braking unit for simultaneously braking two successive or adjacent wheels of a railway vehicle. Such wheels could be, for example, the two wheels on one side of a four-wheel truck. The braking unit is positioned to exert a braking force upon railway vehicle wheels 4 and 4' and is constructed symmetrically with respect to a plane passing through the longitudinal axis of the actuating cylinder 11' and is perpendicular to the longitudinal axis of the brake shoe rod 3'. Except for the omission of the manually operated components, each symmetrical half of the unit of FIG. 3 corresponds to that structure of the unit in FIG. 1 located to the left of a plane passing through the longitudinal axis of actuating cylinder 11 and perpendicular to the longitudinal axis of the brake shoe rod 3. The braking unit of FIG. 3 is attached to the railway vehicle frame by means of lugs 35.

It is apparent that the unit of FIG. 3 will function in the same manner as the unit of FIG. 1. When compressed air under pressure is admitted to the actuating cylinder 11' a force will be applied against the diaphragm piston 12' to move the piston rod 15 downwardly to cause the double-sided wedge member 17' to transmit the force to both brake shoe rods 3'. The brake shoes 7 and 7' will thus be moved in opposite directions against their respective wheels 4 and 4'.

If so desired, both of the braking units shown in FIGS. 2 and 3 may be provided with manually operated braking mechanism of the nature as shown in FIG. 1. Further, the braking unit of FIG. 3 may be provided with a spring storage cylinder as used in the unit of FIG. 2 in place of the diaphragm actuating cylinder as shown.

Thus it can be seen that the present invention has provided a simple yet effective braking unit for railway vehicles wherein the force exerted by an actuating rod is translated at right angles to the brake shoes which are urged into frictional engagement with the peripheries of the railway wheels. The translating mechanism comprises a minimum of moving parts and occupies a very small space as compared to previously known translating mechanisms. The braking unit can be readily attached to the frame of the railway vehicle and, with modifications as described above, can be employed to simultaneously actuate the brakes on two successive wheels of the railway vehicle.

It will be understood that this invention is subject to modification in order to adapt it to different uses and conditions and, accordingly, it is desired to comprehend such modification within this invention as may fall within the scope of the appended claims.

I claim:

1. In a railway vehicle-braking system, the combination of brake shoe rod means axially movable in a radial direction with respect to a railway vehicle wheel and having one end directed toward the periphery of the wheel and the other end having an inclined surface thereon, an actuating rod spaced from said other end of said brake shoe rod means and axially movable substantially perpendicularly to the axial movement of said brake shoe rod means, wedge means on said actuating rod and having a surface thereon parallel to said brake shoe rod means inclined surface, and roller means between said parallel surface whereby axial movement of said actuating rod is translated into axial movement of said brake shoe rod means, said actuating rod having an elongated opening therein, manual brake operating means including a pivotally mounted lever, and a pin on one end of said lever and movably received within said elongated opening whereby said pin and elongated opening connection moves in substantially the axial direction of said actuating rod.